United States Patent
Zhang et al.

(10) Patent No.: US 10,705,373 B2
(45) Date of Patent: Jul. 7, 2020

(54) LIQUID CRYSTAL DISPLAY PANEL AND DISPLAY DEVICE

(71) Applicant: SHANGHAI TIANMA MICRO-ELECTRONICS CO., LTD., Shanghai (CN)

(72) Inventors: Huanxi Zhang, Shanghai (CN); Xiangjian Kong, Shanghai (CN); Ming Xie, Shanghai (CN); Lei Wang, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 0 days.

(21) Appl. No.: 16/186,582

(22) Filed: Nov. 12, 2018

(65) Prior Publication Data
US 2019/0079344 A1    Mar. 14, 2019

(30) Foreign Application Priority Data
Jun. 21, 2018  (CN) .......................... 2018 1 0642707

(51) Int. Cl.
*G02F 1/1335*    (2006.01)
*G02F 1/1343*    (2006.01)
(Continued)

(52) U.S. Cl.
CPC .... *G02F 1/133514* (2013.01); *G02F 1/13394* (2013.01); *G02F 1/13439* (2013.01);
(Continued)

(58) Field of Classification Search
CPC ......... G02F 1/133555; G02F 1/133553; G02F 2203/02; G02F 1/133514; G02F 1/133512; G09G 2320/0209
See application file for complete search history.

(56) References Cited

U.S. PATENT DOCUMENTS 6,624,860 B1 *  9/2003  Narutaki ................ G02B 5/201
                                                 349/106
2004/0207781 A1 * 10/2004  Yoshida ............ G02F 1/133514
                                                 349/108
(Continued)

FOREIGN PATENT DOCUMENTS

CN         107589610 A    1/2018
CN         108227284 A    6/2018

*Primary Examiner* — Michael H Caley
*Assistant Examiner* — Mariam Qureshi
(74) *Attorney, Agent, or Firm* — Kilpatrick Townsend & Stockton, LLP

(57) ABSTRACT

A liquid crystal display panel and a display device are disclosed. The liquid crystal display panel includes an array substrate and an opposite substrate arranged opposite to each other, reflecting metal located on the side of the array substrate facing the opposite substrate, color filters arranged in an array on the side of the opposite substrate facing the array substrate, and black matrixes located on the side of the opposite substrate facing the array substrate, where strip-shaped first opening areas extending in a second direction are arranged between each pair of adjacent color filters in different colors arranged in a first direction, and the black matrixes and the first opening areas are arranged alternately in the second direction.

19 Claims, 14 Drawing Sheets

(51) Int. Cl.
*G02F 1/1339* (2006.01)
*G02F 1/1362* (2006.01)
G09G 3/36 (2006.01)
G02F 1/1368 (2006.01)

(52) U.S. Cl.
CPC .. *G02F 1/133512* (2013.01); *G02F 1/133553* (2013.01); *G02F 1/133555* (2013.01); *G02F 1/134336* (2013.01); *G02F 1/136286* (2013.01); *G02F 1/1368* (2013.01); *G02F 2201/123* (2013.01); *G02F 2203/01* (2013.01); *G02F 2203/02* (2013.01); *G09G 3/3607* (2013.01); *G09G 3/3674* (2013.01); *G09G 3/3685* (2013.01); *G09G 2320/0209* (2013.01)

(56) References Cited

U.S. PATENT DOCUMENTS

| | | | |
|---|---|---|---|
| 2005/0024560 A1* | 2/2005 | Yang | G02F 1/133514 349/114 |
| 2006/0290830 A1* | 12/2006 | Teramoto | G02F 1/133514 349/56 |
| 2007/0263143 A1* | 11/2007 | Igeta | G02F 1/133555 349/110 |
| 2019/0129221 A1* | 5/2019 | Chen | G02F 1/13394 |

* cited by examiner

-- Prior Art --

-- Prior Art --

LIQUID CRYSTAL DISPLAY PANEL AND DISPLAY DEVICE

CROSS REFERENCE

This application claims the benefit and priority of Chinese Patent Application No. 201810642707.0, filed Jun. 21, 2018. The entire disclosure of the above application is incorporated herein by reference.

FIELD

The present disclosure relates to the field of display technologies, and particularly to a liquid crystal display panel and a display device.

BACKGROUND

Existing liquid crystal display panels can be categorized into transmitive, reflective, and semi-reflective and semi-transmitive liquid crystal display panels dependent upon their light sources, where no backlight source is arranged in the reflective liquid crystal display panel, and a backlight source is arranged in only the transmitting area of the semi-reflective and semi-transmitive liquid crystal display panel. No backlight source or a smaller backlight source is arranged so that power consumption of the liquid crystal display panel can be greatly lowered, so more and more attention has been paid to the reflective, and semi-reflective and semi-transmitive liquid crystal display panels.

An external light source is reflected by reflecting metal on an array substrate of either the existing reflective liquid crystal display panel, or the existing semi-reflective and semi-transmitive liquid crystal display panel, the reflectivity thereof depends upon a really working reflecting area. As illustrated in FIG. 1, in order to prevent color crosstalk between adjacent color filters 21 in different colors, a black matrix 22 is arranged between the adjacent color filters 21 in different colors, but a part of the area of reflecting metal 11 may be shielded with the arranged black matrix 22, so a part of the working reflecting area may be lost, thus degrading the utilization ratio of the reflecting metal 11, so that the reflectivity may be lowered. Also some light rays may be lost due to the color filters 21 arranged on the side of an opposite substrate 2 facing the array substrate 1, thus lowering the reflectivity.

Accordingly improving the reflectivity of the liquid crystal display panel is desired.

SUMMARY

Embodiments of the disclosure provide a liquid crystal display panel and a display device.

An embodiment of the disclosure provides a liquid crystal display panel. The liquid crystal display panel includes an array substrate and an opposite substrate arranged opposite to each other, reflecting metal located on the side of the array substrate facing the opposite substrate, color filters arranged in an array on the side of the opposite substrate facing the array substrate, and black matrixes located on the side of the opposite substrate facing the array substrate.

Adjacent color filters in different colors are arranged in a first direction. Strip-shaped first opening areas extending in a second direction are arranged between each pair of the adjacent color filters in different colors. Each of the first opening areas includes sub-opening areas located respectively on adjacent boundaries of the pair of adjacent color filters in two different colors. The second direction is perpendicular to the first direction.

The black matrixes are located between each pair of the color filters in different colors, and the black matrixes and the first opening areas are arranged alternately in the second direction.

The reflecting metal is overlapped with orthographic projection of each of the first opening areas on the array substrate in a first overlapping area.

An embodiment of the disclosure provides a display device. The display device includes the liquid crystal display panel above according to the embodiment of the disclosure.

DETAILED DESCRIPTION OF THE EMBODIMENTS

Figure 1:
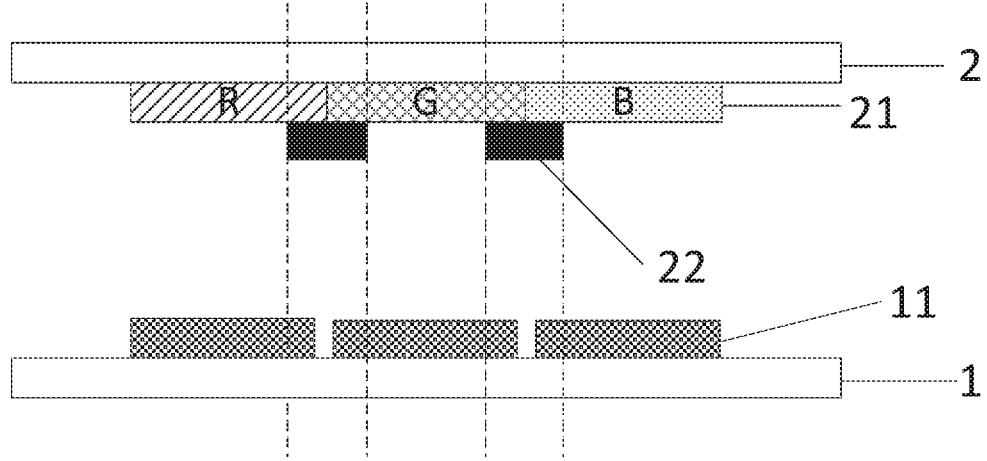
FIG. 1 is a schematic structural diagram of a liquid crystal display panel in a sectional view.
Figure 2:
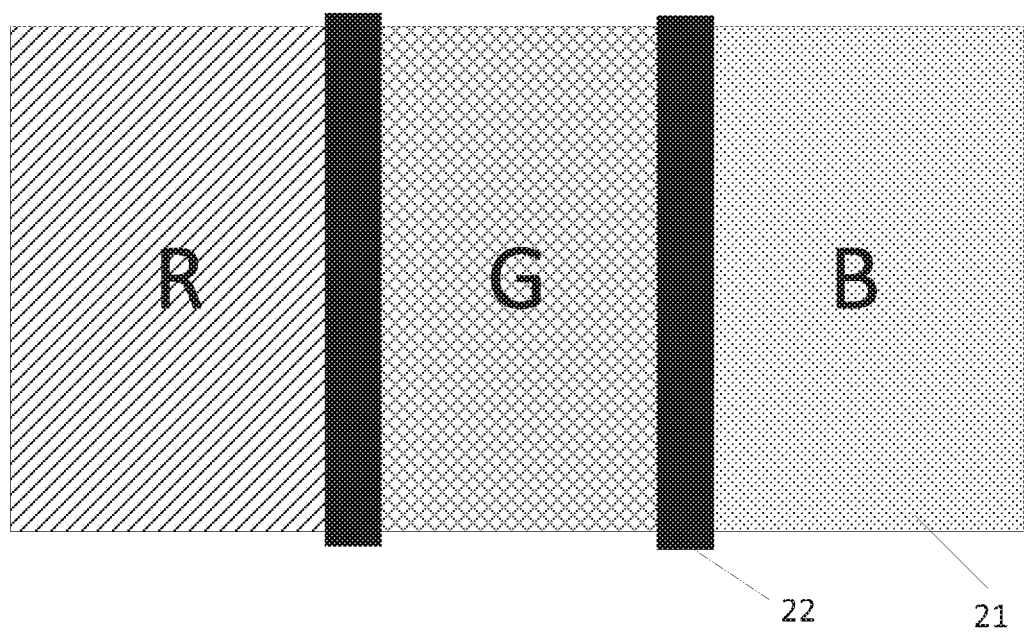
FIG. 2 is a schematic structural diagram of orthographic projections of color filters and black matrixes onto the opposite substrate in the liquid crystal display panel in the prior art.

In order to address the problem of color crosstalk between adjacent color filters in different colors, as illustrated in FIG. 1 and FIG. 2, the black matrixes 22 are generally arranged between the color filters 21 in different colors to thereby cover overlapping areas between the color filters 21 in different colors so as to prevent color crosstalk from occurring, which would otherwise degrade a display effect of the display panel. However a part of the area of the reflecting metal 11 may be covered by the arranged black matrixes 22, that is, orthographic projections of the black matrixes 22 onto the array substrate 1 may overlap with a orthographic projection of the reflecting metal 11 onto the array substrate 1, thus reducing the working reflecting area of the reflecting metal 11, and degrading the utilization ratio of the reflecting metal 11, so that the reflectivity may be lowered. Accordingly it is highly desirable to improve the reflectivity while preventing color crosstalk between the adjacent color filters in different colors.

Embodiments of the disclosure provide a liquid crystal display panel and a display device. In some embodiments, particular implementations of the liquid crystal display panel and the display device according to embodiments of the disclosure will be described below in details with reference to the drawings. It shall be appreciated that some embodiments to be described below are merely intended to illustrate and explain the disclosure, but not intended to limit the disclosure thereto. Furthermore the embodiments of the disclosure and the features in the embodiments can be combined with each other unless they conflict with each other.

The sizes and shapes of respective components in the drawings are not intended to reflect any real proportion, but only intended to illustrate the disclosure of the disclosure.

Figure 3:
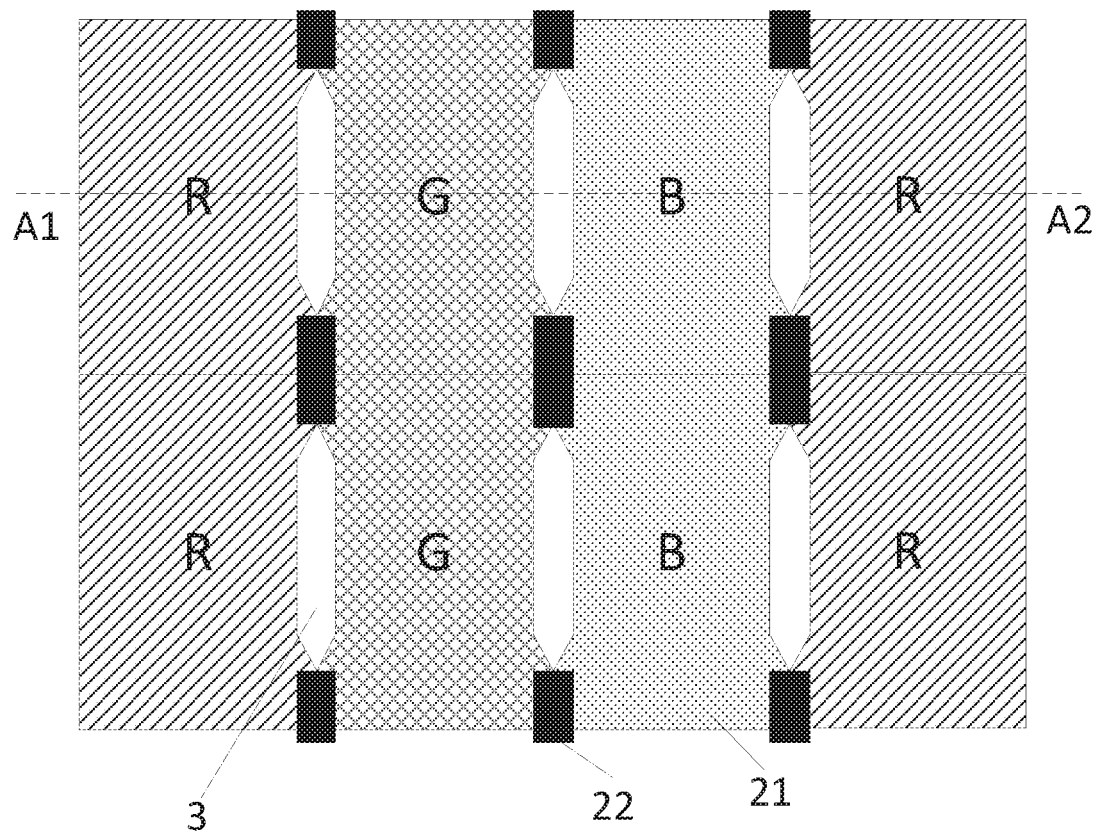
FIG. 3 is a schematic structural diagram of first opening areas relative to pixels in respective colors in a liquid crystal display panel according to an embodiment of the disclosure.
Figure 4:
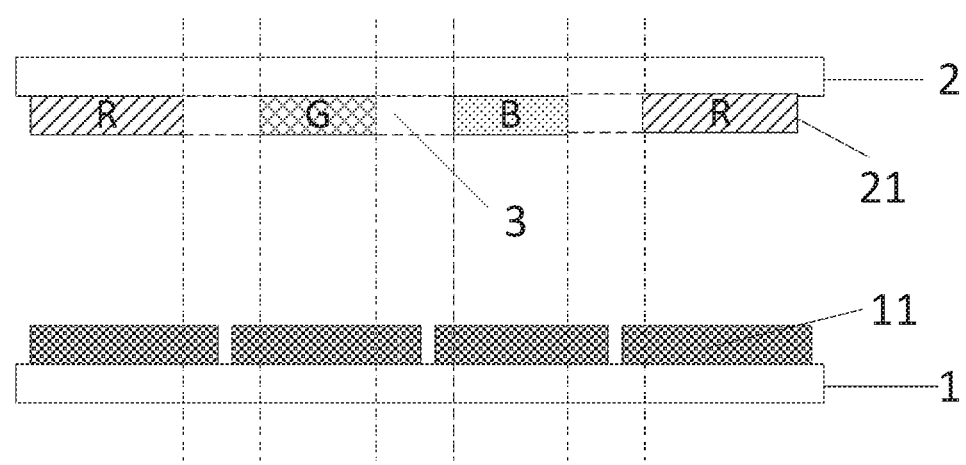
FIG. 4 is a sectional view of the liquid crystal display panel along A1-A2 in FIG. 3.
Figure 5:
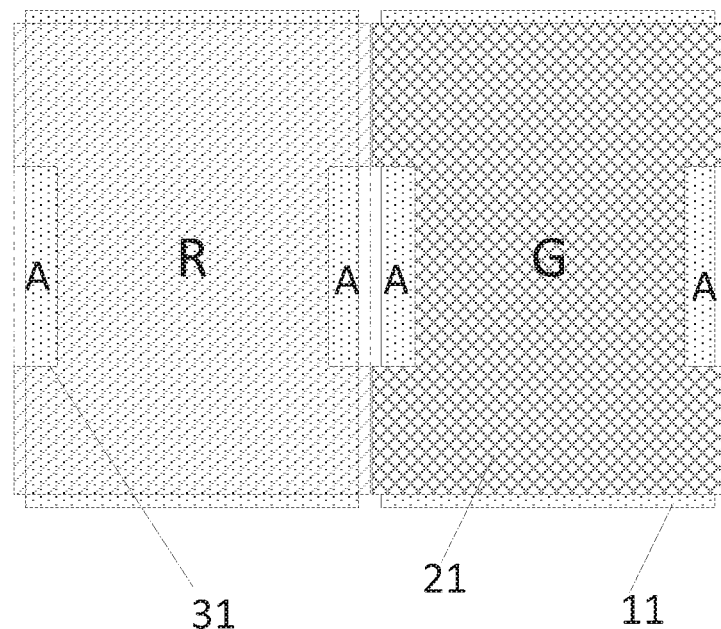
FIG. 5 is a top view corresponding to the liquid crystal display panel illustrated in FIG. 4.

An embodiment of the disclosure provides a liquid crystal display panel as illustrated in FIG. 3, FIG. 4, and FIG. 5, where the liquid crystal display panel includes: an array substrate 1 and an opposite substrate 2 arranged opposite to each other, reflecting metal 11 located on the side of the array substrate 1 facing the opposite substrate 2, color filters 21 arranged in an array on the side of the opposite substrate 2 facing the array substrate 1, and black matrixes 22 located on the side of the opposite substrate 2 facing the array substrate 1.

Adjacent color filters 21 in different colors are arranged in a first direction, strip-shaped first opening areas 3 extending in a second direction are arranged between each pair of the adjacent color filters 21 in different colors, and the first opening areas 3 each includes sub-opening areas located respectively on adjacent boundaries of the pair of adjacent color filters 21 in two different colors, where the second direction is perpendicular to the first direction.

The black matrixes 22 are located between each pair of adjacent color filters 21 in different colors, and the black matrixes 22 and the first opening areas 3 are arranged alternately in the second direction.

The reflecting metal 11 is overlapped with orthographic projection of each of the first opening areas 3 on the array substrate 1 in a first overlapping area.

Figure 6:
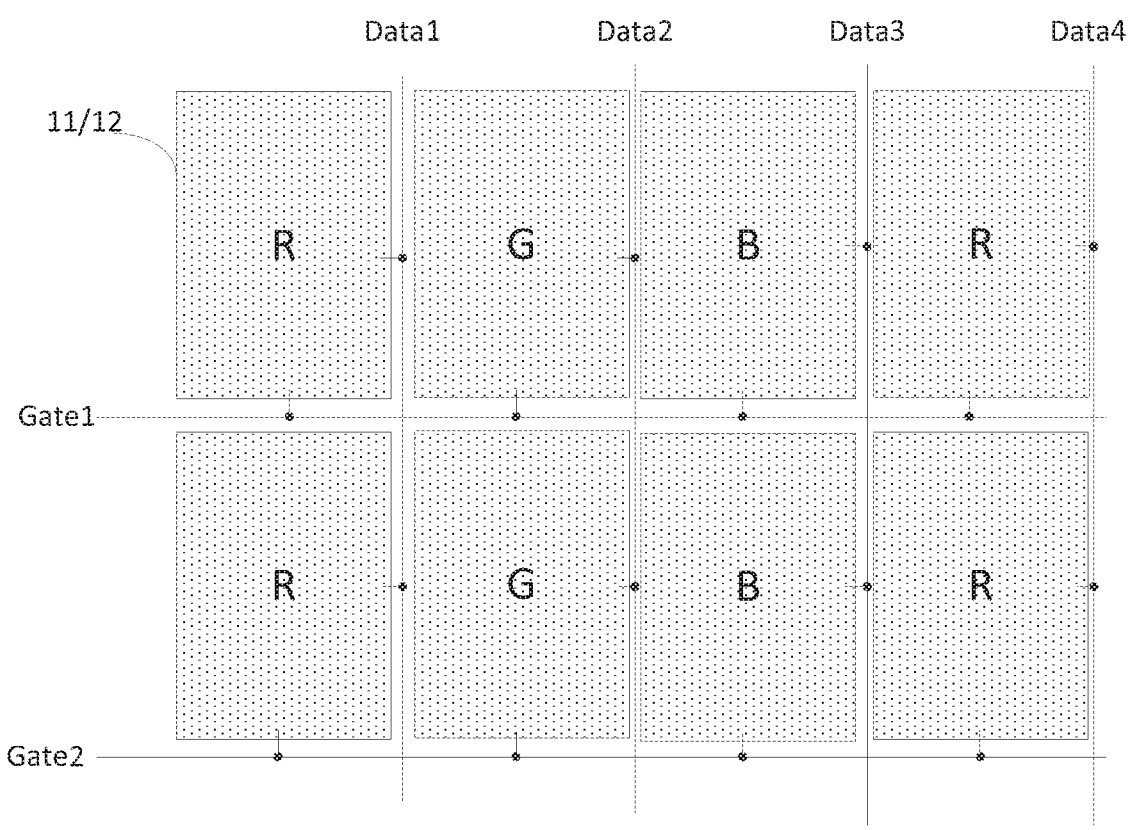
FIG. 6 is a schematic structural diagram of an array substrate in a liquid crystal display panel according to an embodiment of the disclosure.

As illustrated in FIG. 6, scan lines Gate and data lines Data, and pixel electrodes, arranged in a matrix, defined by the scan lines Gate and the data lines Data, are further arranged on the side of the array substrate facing the opposite substrate, where the pixel electrodes are composed of transparent electrodes 12 arranged on the side of the array substrate facing the opposite substrate, and the reflecting metal 11 arranged on the sides of the transparent electrodes 12 facing the opposite substrate. Of course, the reflecting metal 11 can alternatively be reused as the transparent electrodes 12, and the pixel electrodes can be particularly arranged as needed in reality, although the embodiment of the disclosure will not be limited thereto, where the respective pixel electrodes correspond to the color filters in the respective colors arranged on the side of the opposite substrate facing the array substrate, and for example, the respective pixel electrodes in FIG. 6 are arranged corresponding to the respective color filters at the corresponding positions in FIG. 3 so that the liquid crystal display panel can display normally. In one embodiment, the transparent electrodes 12 can be tin indium oxide.

A liquid crystal display panel according to an embodiment of the disclosure includes: an array substrate and an opposite substrate arranged opposite to each other, reflecting metal located on the side of the array substrate facing the opposite substrate, color filters arranged in an array on the side of the opposite substrate facing the array substrate, and black matrixes located on the side of the opposite substrate facing the array substrate, where strip-shaped first opening areas extending in a second direction are arranged between each pair of adjacent color filters in different colors arranged in a first direction, and the black matrixes and the first opening areas are arranged alternately in the second direction, so that the area of the black matrixes shielding the reflecting metal can be reduced, the working reflecting area of the reflecting metal can be increased, and the reflectivity can be improved, while addressing color crosstalk between the adjacent color filters in different colors.

In addition to this, the first opening areas arranged between the color filters in different colors are not covered with any color filter, so each first opening area can be equivalent to a white sub-pixel, and in this way, a white sub-pixel is arranged between sub-pixels in different colors so that display brightness of the liquid crystal display panel can be improved in effect; and instead of arranging the white sub-pixels separately, the first opening areas are arranged as the additional white sub-pixels so that the white sub-pixels can be driven without any separate drive voltage, thus lowering power consumption of the liquid crystal display panel.

It shall be noted that in a liquid crystal display panel according to an embodiment of the disclosure, the strip-shaped first opening areas extending in the second direction are arranged between the color filters in different colors, where the first opening areas are arranged between the adjacent color filters in two different colors at the same layer, and the first opening areas each are composed of two sub-opening areas respectively arranged respectively on adjacent boundaries of the adjacent color filters in two different colors, where the areas of the two sub-openings may or may not be equal, dependent upon the color proportion for display between the color filters in different colors in a real application, although the embodiment of the disclosure will not be limited thereto. Here the strip-shaped first opening areas extending in the second direction refer to that the length of a first opening area in the first direction is less than the length thereof in the second direction, so as to avoid such a situation that the length of the first opening area in the first direction is too large, then an area of the color filters for display may be occupied.

In addition to the first opening areas arranged between the adjacent color filters in two different colors, the black matrixes are further arranged at those positions, between the adjacent color filters in two different colors, where no first opening areas are arranged, and FIG. 1 illustrates a sectional view in the first direction where the black matrixes are arranged. The black matrixes are further arranged between the adjacent color filters in the two colors other than the first opening areas because the areas of the first opening areas are designed as needed in reality, and lengths of the first opening areas in the first direction and lengths of the first opening areas in the second direction lie in some range; and in some design, not all the areas between the adjacent color filters in two different colors are arranged as the first opening areas, so in order to prevent color crosstalk from occurring between the adjacent color filters in two different colors at those positions where no first opening areas are arranged, the black matrixes shall be arranged at those positions where no first opening areas are arranged, so that the first opening areas and the black matrixes arranged alternately in the second direction are formed between the adjacent color filters in two different colors.

In a liquid crystal display panel according to an embodiment of the disclosure, the reflecting metal is arranged to reflect an external light source so that reflected light is displayed, where the working reflecting area of the reflecting metal determines the display quality to some extent, so the reflecting area can be increased in effect by alleviating the reflecting metal from being shielded by the black matrixes and the color filters, to thereby improve the reflectivity. As illustrated in FIG. 5, sub-opening areas 31 are arranged on the boundaries of the color filters 21 in the respective colors on both of their sides in the first direction, there are overlapping areas A between orthographic projections of the respective sub-opening areas 31 onto the array substrate, and the orthographic projection of the corresponding reflecting metal 11 onto the array substrate, and two overlapping areas A between the adjacent color filters 21 in two colors compose a first overlapping area, so the first overlapping areas can be arranged to alleviate in effect the reflecting metal from being shielded by the black matrixes and the color filters, that is, there are the first overlapping areas between the orthographic projection of the reflecting metal onto the array substrate, and the orthographic projections of the first opening areas onto the array substrate to thereby alleviate the reflecting metal from being shielded by the black matrixes and the color filters, so as to improve the reflectivity.

Figure 7:
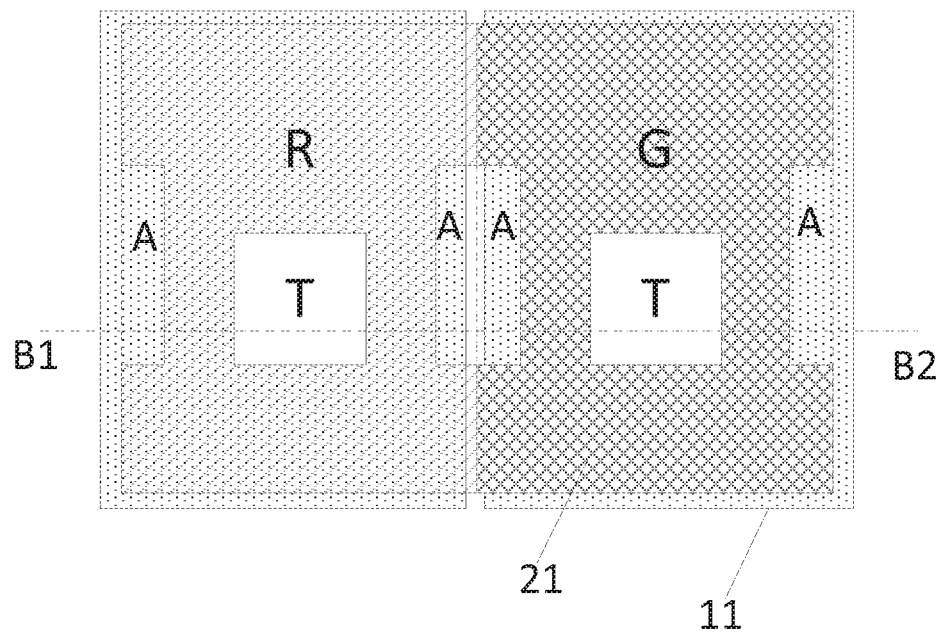
FIG. 7 is a schematic structural diagram of a transmitting area in a liquid crystal display panel according to an embodiment of the disclosure.
Figure 8:
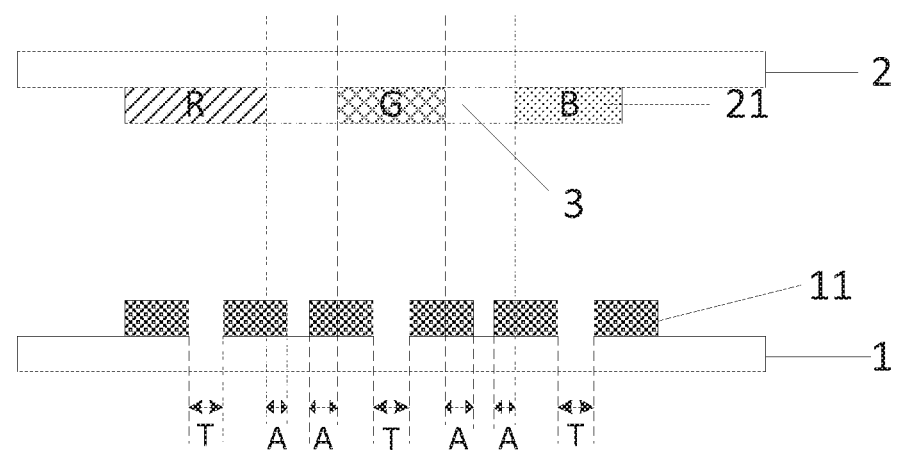
FIG. 8 is a sectional view of the liquid crystal display panel along B1-B2 in FIG. 7.

In one embodiment, in a liquid crystal display panel according to an embodiment of the disclosure, as illustrated in FIG. 7 and FIG. 8, the liquid crystal display panel further includes transmitting areas T, orthographic projections of the color filters 21 corresponding to the transmitting areas T onto the array substrate 1 completely cover orthographic projections of the transmitting areas T onto the array substrate 1, and there are no overlapping areas between the transmitting areas T and the sub-opening areas A. It shall be noted that the transmitting areas T are arranged corresponding to the sub-pixels, that is, at least one transmitting area T is arranged in a sub-pixel. Particularly in a liquid crystal display panel above according to an embodiment of the disclosure, the liquid crystal display panel is a semi-reflective and semi-transmitive liquid crystal display panel, the transmitting areas are formed by forming holes running through the reflecting metal the areas where the color filters is located completely cover the transmitting areas, and the backlight source is incident onto the color filters through the transmitting areas, so an image is displayed at the pixels; and there are no overlapping areas between the transmitting areas and the sub-opening areas, so that an image is displayed normally at the color filters corresponding to the transmitting areas on one hand, and the working reflecting area increased due to the arrangement of the sub-opening areas can be avoided from being reduced due to the arrangement of the transmitting areas on the other hand.

Figure 9:
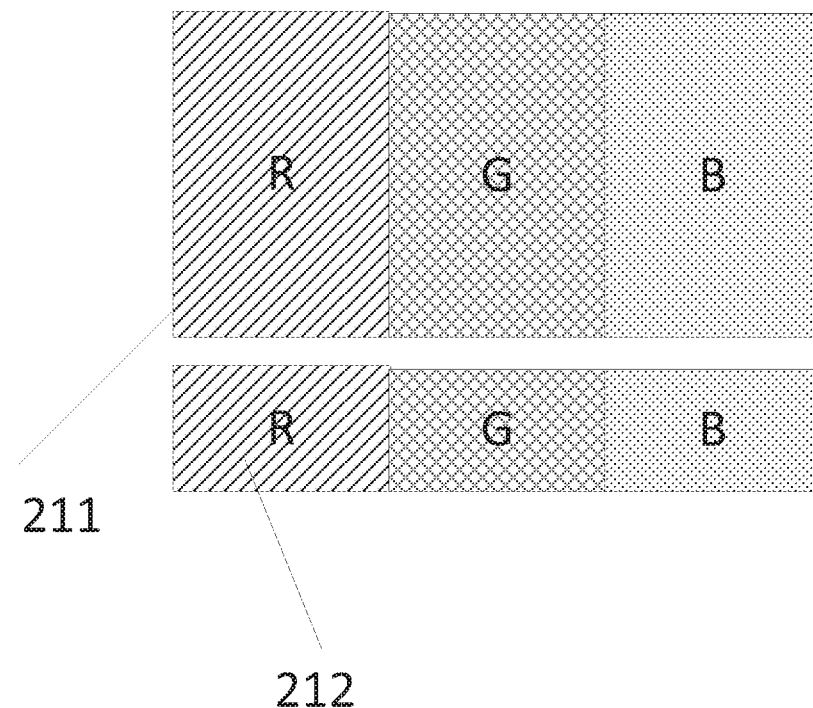
FIG. 9 is a schematic structural diagram of an arrangement pattern of color filters in a liquid crystal display panel according to an embodiment of the disclosure.

In related art, in order to lower power consumption of the liquid crystal display panel, and to display in 64 colors on the liquid crystal display panel at lower power consumption, particularly as illustrated in FIG. 9, the color filters in each color includes a first color filter area 211 and a second color filter area 212, where the area of the first color filter area 211 is larger than the area of the second color filter area 212. In this structure, each pixel can display in at most four colors including: black, a first color generated by light rays passing only the first color filter area, a second color generated by light rays passing only the second color filter area, and a composite color generated by light rays passing both the first color filter area and the second color filter area, and when the array of pixels includes pixels in three colors, only two different drive voltage will be provided to the respective pixel electrodes to enable and disable them respectively so that the liquid crystal display panel can display in 64 colors, thus lowering power consumption arising from varying the drive voltage.

Figure 10:
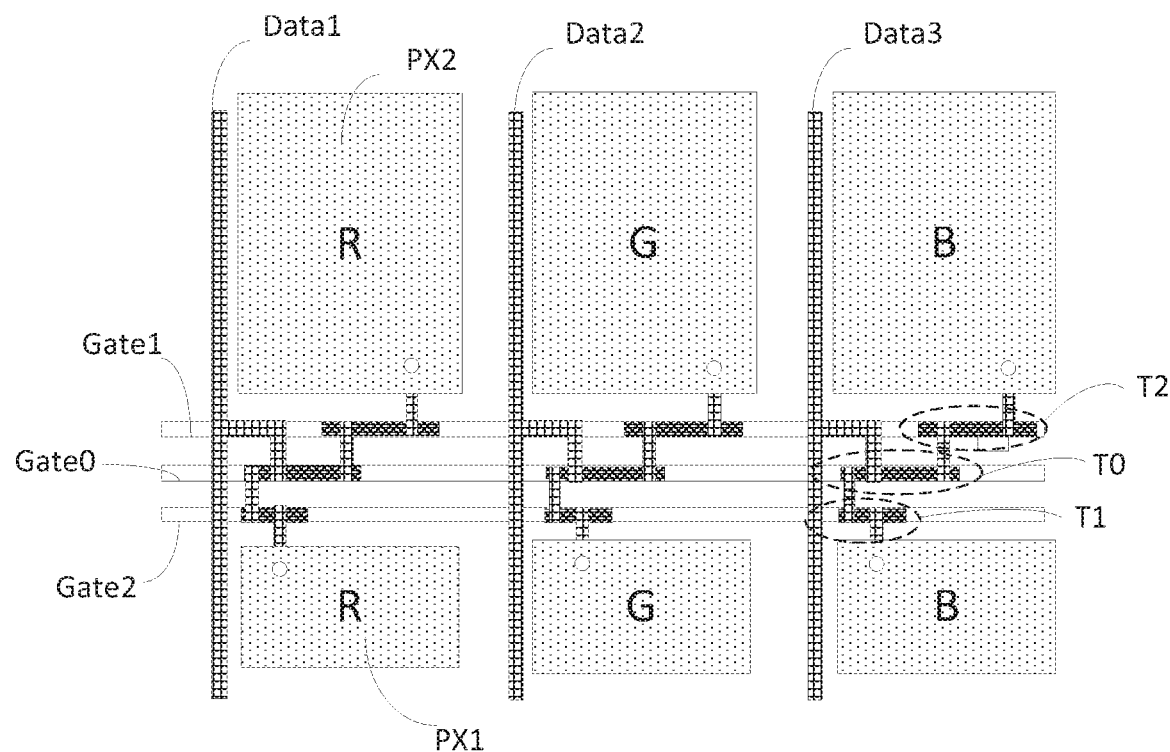
FIG. 10 is a schematic structural diagram of another array substrate in a liquid crystal display panel according to an embodiment of the disclosure.

FIG. 10 illustrates an arrangement pattern of pixel electrodes arranged on the side of the array substrate facing the opposite substrate, where each pixel includes a first pixel electrode PX1 and a second pixel electrode PX2 arranged corresponding respectively to the first color filter area and the second color filter area, and each pixel electrode is composed of a transparent electrode arranged on the side of the array substrate facing the opposite substrate, and the reflecting metal arranged on the side of the transparent electrode facing the opposite substrate; and of course, the reflecting metal can alternatively be reused as the transparent electrode, and the pixel electrodes can be particularly arranged as needed in reality, although the embodiment of the disclosure will not be limited thereto. Here the first pixel electrode PX1 and the second pixel electrode PX2 are insulated from each other, the first pixel electrode PX1 and the second pixel electrode PX2 are arranged in the direction in which the data line Data extends, a first scan line Gate1, a primary scan line Gate0, and a second scan line Gate2 are arranged in the first direction between the first pixel electrode PX1 and the second pixel electrode PX2, and a primary thin film transistor T0, a first thin film transistor T1, and a second thin film transistor T2 (particular structures of the thin film transistors are not illustrated) are further arranged between the first pixel electrode PX1 and the second pixel electrode PX2, where the primary thin film transistor T0 has a gate connected with the primary scan line Gate0, a source connected with the data line Data corresponding to both the first pixel electrode PX1 and the second pixel electrode PX2, a first drain connected with a source of the first thin film transistor T1, and a second drain connected with a source of the second thin film transistor T2; the first thin film transistor T1 has a gate connected with the first scan line Gate1, and a drain connected with the first pixel electrode PX1; and the second thin film transistor T2 has a gate connected with the second scan line Gate2, and a drain connected with the second pixel electrode PX2, that is, the first pixel electrode PX1 is driven by the primary thin film transistor T0 and the first thin film transistor T1, and the second pixel electrode PX2 is driven by the primary thin film transistor T0 and the second thin film transistor T2, so that the first pixel electrode PX1 and the second pixel electrode PX2 can be provided separately with drive voltage. Of course, the primary thin film transistor T0, the first thin film transistor T1, and the second thin film transistor T2 can alternatively be switched on concurrently to provide both the first pixel electrode PX1 and the second pixel electrode PX2 with drive voltage so that the liquid crystal display panel displays in 64 colors.

Figure 11:
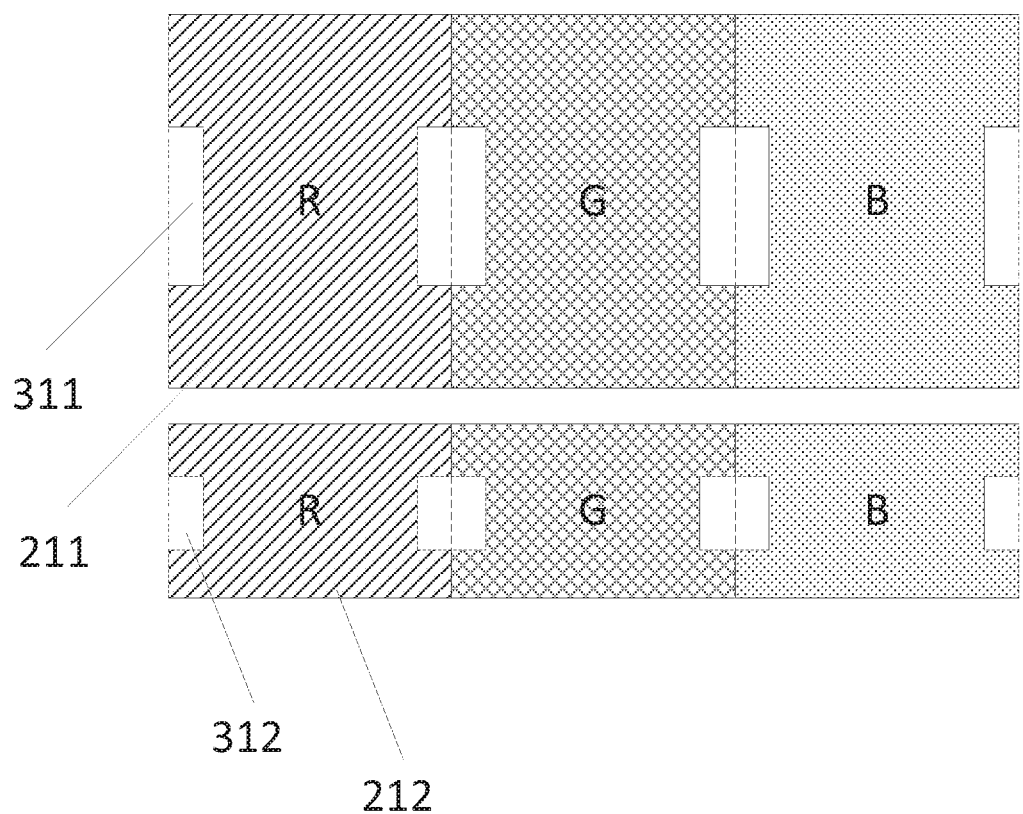
FIG. 11 is a schematic structural diagram of another arrangement pattern of color filters in a liquid crystal display panel according to an embodiment of the disclosure.

For the liquid crystal display panel with low power consumption, in order to improve the reflectivity, sub-opening areas can also be arranged on the boundaries of the first color filter areas and the second color filter areas corresponding to the respective color filters on both of their sides in the first direction, and as illustrated FIG. 11, first sub-opening areas 311 are arranged on the boundaries of the first color filter areas 211 of the respective color filters on both of their sides in the first direction, and second sub-opening areas 312 are arranged on the boundaries of the second color filter areas 212 of the respective color filters on both of their sides in the first direction, so that the respective first color filter areas and second color filter areas are regarded as separate color filters, and the opening areas can be arranged to improve the reflectivity, particularly as the opening areas arranged on the color filter, so a repeated description thereof will be omitted here.

Figure 12:
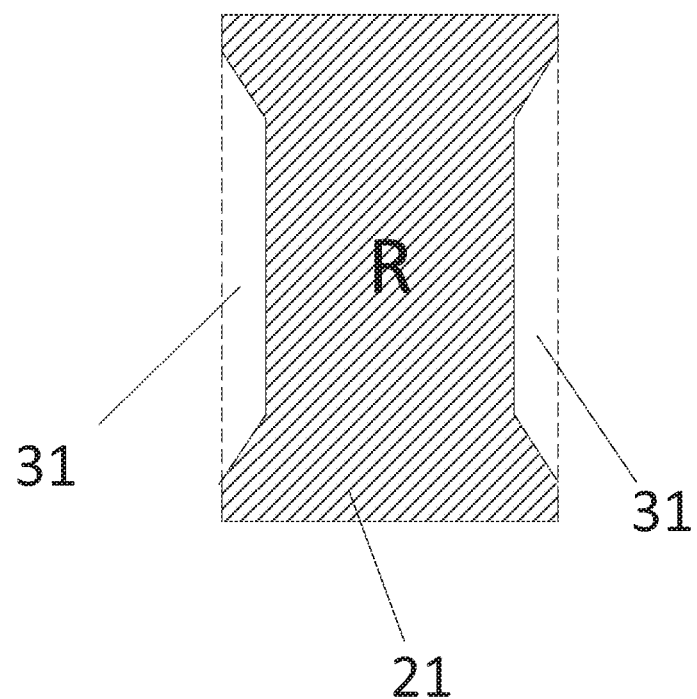
FIG. 12 is a schematic structural diagram of sub-opening areas arranged on boundaries of a color filter in one color in a first direction in a liquid crystal display panel according to an embodiment of the disclosure.

In one embodiment, in a liquid crystal display panel according to an embodiment of the disclosure, the areas of two sub-opening areas 31 on the boundaries of the same color filter 21 on both of its sides in the first direction are equal as illustrated in FIG. 12.

Particularly in a liquid crystal display panel according to an embodiment of the disclosure, the areas of two sub-opening areas on the boundaries of the same color filter on both of its sides in the first direction are set equal so that the lengths, of the two sub-opening areas on the boundaries of the same color filter on both of its sides in the first direction, in both the first direction and the second direction are equal, so the sub-opening areas to be fabricated can be designed so that the sub-opening area, and a sub-opening area arranged on the boundary of an adjacent color filter, form a first opening area. It shall be noted that FIG. 12 merely illustrates a red color filter by way of an example, but the areas of two sub-opening areas on the boundaries of a color filter in another color on both of its sides in the first direction are also equal, and two sub-opening areas on the boundaries of a color filter in the same color on both of its sides in the first direction are arranged as symmetric patterns symmetric about a symmetry axis of the color filter in the second direction.

Figure 13:
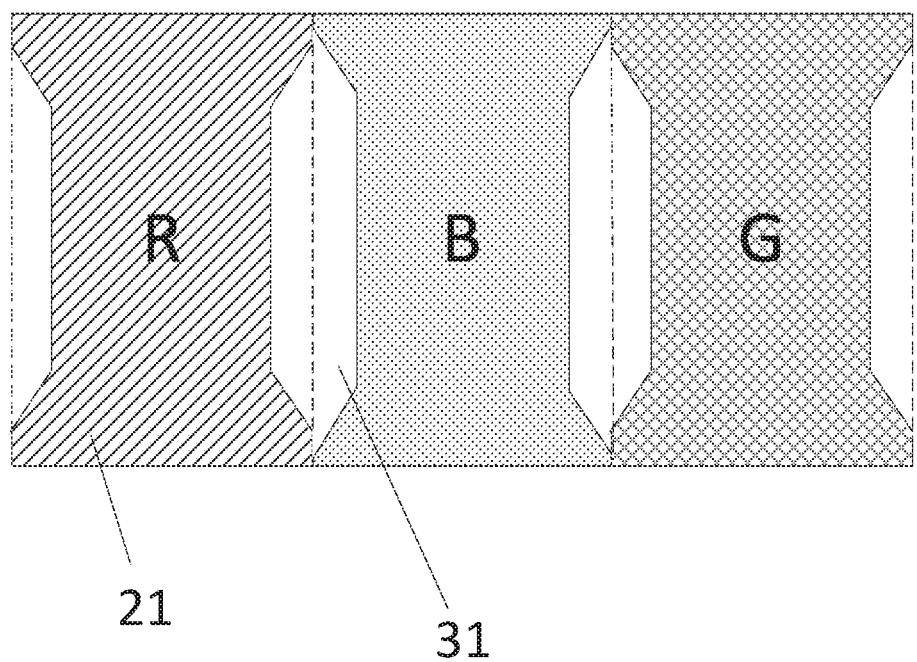
FIG. 13 is a schematic structural diagram of first opening areas in a liquid crystal display panel according to an embodiment of the disclosure.

In one embodiment, in a liquid crystal display panel according to an embodiment of the disclosure, the areas of the respective sub-opening areas 31 on the boundaries of the respective color filters 21 in different colors are unequal as illustrated in FIG. 13.

Particularly in a liquid crystal display panel according to an embodiment of the disclosure, in order to satisfy a demand for displaying on the liquid crystal display panel, areas of color filters in different colors are arranged different, and generally the area of color filters in a color with higher transmitivity can be arranged slightly smaller than the area of color filters in other colors to thereby satisfy a proportion of the different colors while displaying, and accordingly the areas of sub-opening areas arranged on the boundaries of the color filters in the color with higher transmitivity on both of its sides in the first direction are larger than the areas of the sub-opening areas corresponding to the color filters in the other colors. Of course, the areas of the color filters in the respective colors can alternatively be set selectively to satisfy different demands in different scenarios, and for example, if a desirable color tone is cold, then the area of the blue color filters will be set larger than the areas of the color filters in the other colors; and if a desirable color tone is warm, then the area of the red color filters will be set larger than the areas of the color filters in the other colors, where their particular proportion can be selected as needed in reality, although the embodiment of the disclosure will not be limited thereto.

In a particular application, the areas of the sub-opening areas on the boundaries of the respective color filters can be set unequal, or the areas of the sub-opening areas on the boundaries of the color filters in one of the colors can be set different from the areas of the sub-opening areas on the boundaries of the color filters in the other colors, particularly as needed in reality, although the embodiment of the disclosure will not be limited thereto.

Figure 14:
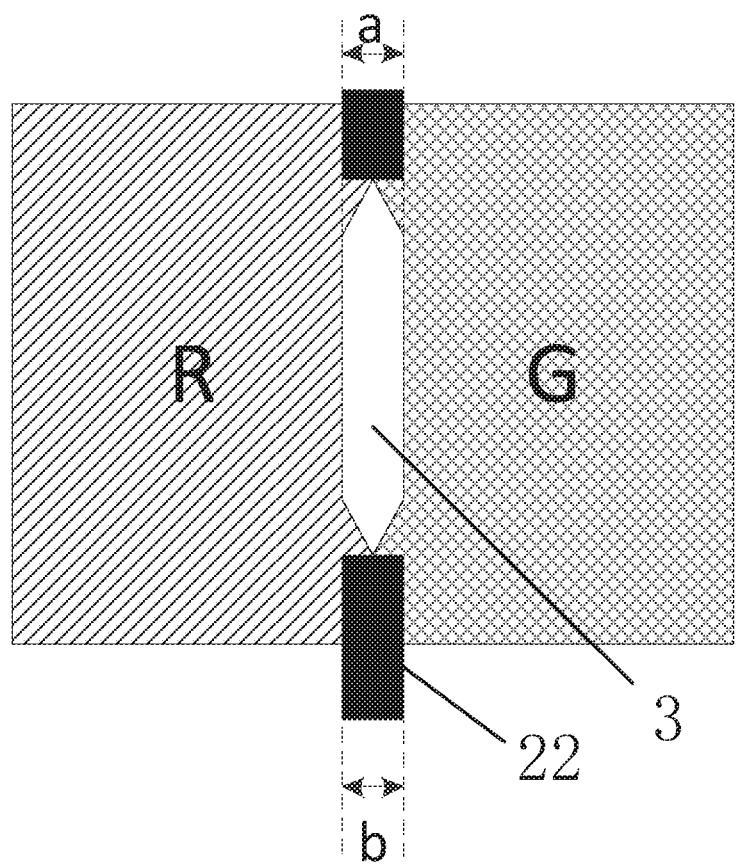
FIG. 14 is a schematic structural diagram of a size relationship between a first opening area and adjacent black matrixes in a liquid crystal display panel according to an embodiment of the disclosure.
Figure 15:
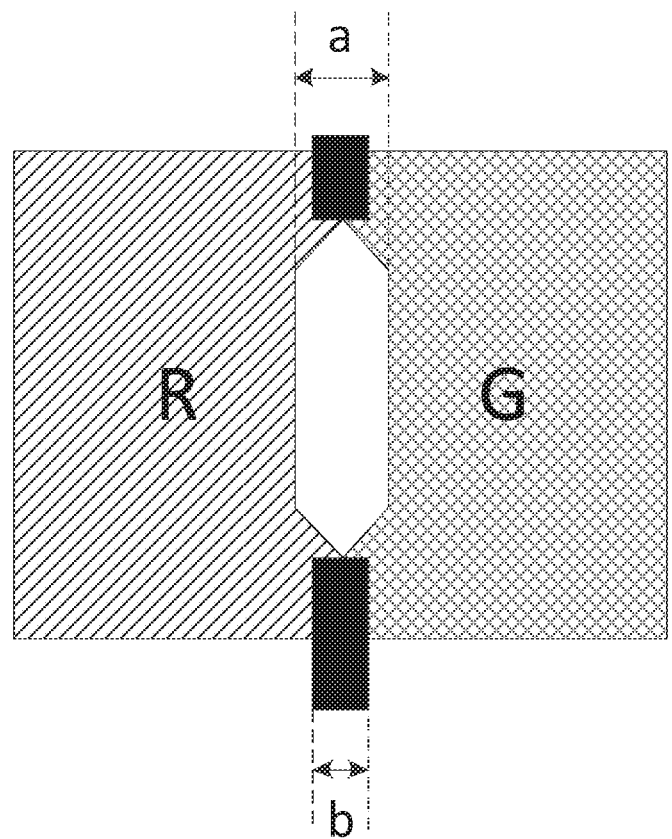
FIG. 15 is a schematic structural diagram of another size relationship between a first opening area and adjacent black matrixes in a liquid crystal display panel according to an embodiment of the disclosure.

In one embodiment, in a liquid crystal display panel according to an embodiment of the disclosure, the length of a first opening area 3 in the first direction is at least equal to the length of a black matrix 22 in the first direction as illustrated in FIG. 14 and FIG. 15.

Particularly in a liquid crystal display panel according to an embodiment of the disclosure, in order to prevent color crosstalk from occurring between the adjacent color filters in two different colors while improving the reflectivity in the first opening areas, as illustrated in FIG. 14, the length 'a' of a first opening area 3 in the first direction shall be set at least equal to the length 'b' of a black matrix 22 adjacent thereto in the first direction, where 'a' refers to the largest length of the first opening area 3 in the first direction; and in order to satisfy the area of the first opening area, the length of the first opening area in the first direction and the length of the 4 first opening area in the second direction are designed so that as illustrated in FIG. 15, the length 'a' of the first opening area 3 in the first direction shall be larger than the length 'b' of the adjacent black matrix 22 in the first direction, and a particular size by which the length of the first opening area in the first direction is larger than the length of the black matrix in the first direction can be selected as needed for the particular design in reality, although the embodiment of the disclosure will not be limited thereto.

It shall be noted that in a liquid crystal display panel according to an embodiment of the disclosure, the black matrixes are arranged to thereby prevent color crosstalk from occurring between the adjacent color filters in two different colors. In an embodiment, the length of a first opening area in the first direction being at least equal to the length of a black matrix in the first direction refers to that the length of a first opening area in the first direction is larger than or equal to the length, of a black matrix arranged to prevent color crosstalk from occurring between adjacent color filters in two different colors, in the first direction, and for a black matrix covering a spacer, the length of a first opening area in the first direction may not be larger than or equal to the length of the black matrix at that position in the first direction, that is, there may be such a case that the length, of a black matrix covering a spacer, in the first direction is larger than the length of a first opening area in the first direction. In addition to this, a black matrix is further arranged at a position corresponding to a spacer to thereby prevent non-uniform rubbing alignment arising from the spacer so as to prevent reflected light from being leaked.

In one embodiment, in a liquid crystal display panel according to an embodiment of the disclosure, the sum of the areas of the respective first opening areas is less than or equal to 67% of the sum of the areas of the respective color filters.

Particularly in a liquid crystal display panel according to an embodiment of the disclosure, the sizes of the first opening areas to be fabricated shall be designed taking into account both a contribution of the first opening areas to the reflectivity, and an influence thereof upon the display areas of the pixels so that the sum of the areas of the first opening areas in the liquid crystal display panel shall be controlled to be less than or equal to 67% of the sum of the areas of the respective color filter, thereby the display panel can display normally, that is, the sum of the areas of the sub-opening areas on the boundaries of the color filters in each color on both of it sides in the first direction shall be made less than or equal to 67% of the area of the color filters in that color.

Figure 16:
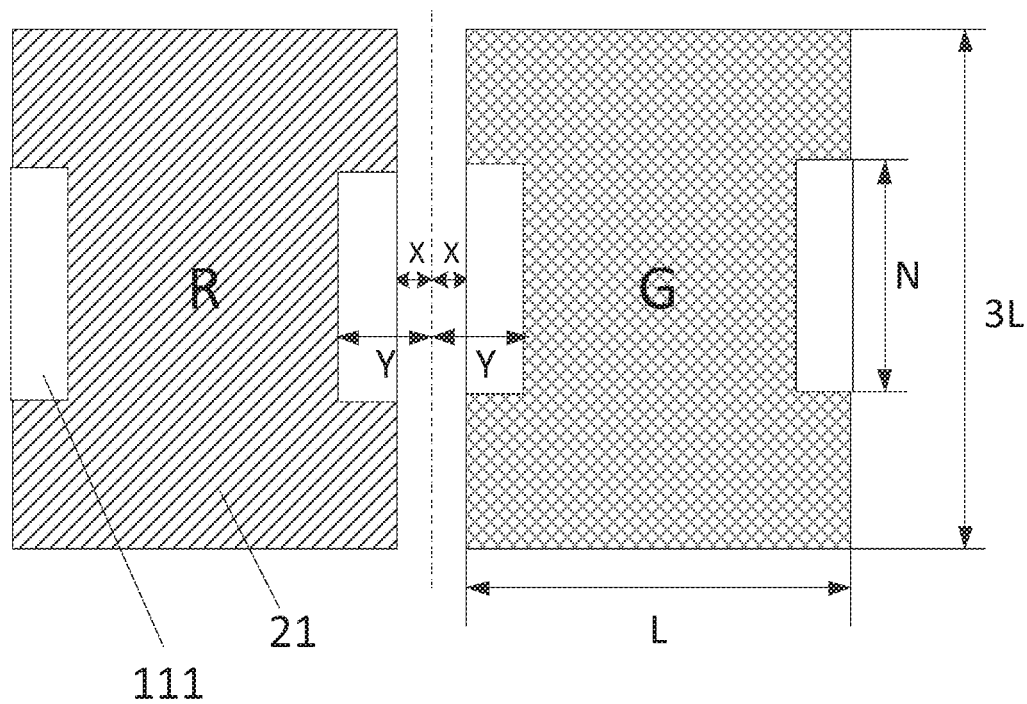
FIG. 16 is a schematic structural diagram of a relative positional relationship between color filters and a reflecting electrode in a liquid crystal display panel according to an embodiment of the disclosure.

For example, FIG. 16 illustrates a schematic structural diagram of such sub-opening areas arranged on both sides of color filters that overlap with reflecting electrodes, where the reflecting metal includes reflecting electrodes 111 corresponding respectively to the respective color filters, the lengths of the color filters 21 in the respective colors in the first direction is L, the lengths thereof in the second direction is 3 L, the distance between the boundaries, arranged with the sub-opening areas, of the adjacent color filters 21 in two colors is 2Y, the distance between two adjacent reflecting electrodes 111 is 2X, the length of a sub-opening area in the second direction is N, the sum of the areas of the sub-opening areas arranged on both of the boundaries of each color filter 21 in the first direction is Ω, and the ratio of the sum of the areas of the sub-opening areas arranged on both of the boundaries of each color filter 21 in the first direction to the area of the color filter is ω, where $\Omega = 2 \times (Y-X) \times N$, and $\omega = \Omega/(L \times 3L - G)$.

In a real fabrication process, the array substrate shall be aligned with the opposite substrate within the maximum alignment offset to thereby guarantee a good yield of the liquid crystal display panel, while improving the reflectivity by arranging the sub-opening areas. Particularly the array substrate may be aligned with the opposite substrate with an offset, it can be determined from the offset and the maximum alignment offset whether the liquid crystal display panel including the aligned substrates is qualified, and when the offset is less than the maximum alignment offset, then the liquid crystal display panel including the aligned substrates will be qualified. The maximum alignment offset can be adjusted according to a varying process condition and required good yield, and the first opening areas can be designed while improving the reflectivity, but also guaranteeing the good yield, in the following several instances.

In one embodiment, in a liquid crystal display panel according to an embodiment of the disclosure, when the ratio of the sum of the areas of the respective first opening areas to the sum of the areas of the respective color filters ranges from 45% to 67%, the length of a first overlapping area in the first direction is no less than the maximum alignment offset when the array substrate is aligned with the opposite substrate.

Particularly in a liquid crystal display panel according to an embodiment of the disclosure, when the ratio of the sum of the areas of the respective first opening areas to the sum of the areas of the respective color filters ranges from 45% to 67%, the lengths N of the sub-opening areas in the second direction are set the largest, that is, all the other areas between adjacent color filters in two different colors than those positions, where black matrixes are arranged corresponding to spacers, are sub-opening areas, and if N is set the largest, then the value of Y will be relatively small because Y is in inverse proportion to N. The value of Y−X shall be more than the maximum alignment offset so that when the array substrate is aligned with the opposite substrate with the maximum offset, there are the first overlapping areas between the sub-opening areas and the reflecting metal, thus increasing the working reflecting area, but also guaranteeing the good yield of the liquid crystal display panel including the aligned substrates.

In one embodiment, in a liquid crystal display panel according to an embodiment of the disclosure, when the ratio of the sum of the areas of the respective first opening areas to the sum of the areas of the respective color filters ranges from 18% to 45%, the length of a first overlapping area in the first direction is equal to the maximum alignment offset when the array substrate is aligned with the opposite substrate.

Particularly in a liquid crystal display panel according to an embodiment of the disclosure, when the ratio of the sum of the areas of the respective first opening areas to the sum of the areas of the respective color filters ranges from 18% to 45%, the length Y−X of the sub-opening area in the first direction are set equal to the maximum alignment offset, where both of the values of X and Y are constant, and since the value of N is in inverse proportion to the value of Y, the value of N is adjusted so that the areas of the sub-opening areas lie in the range above, and in this case, the good yield of the liquid crystal display panel including the aligned substrates can be guaranteed preferentially, but when the array substrate is aligned with the opposite substrate with the maximum offset, there are no first overlapping areas between the sub-opening areas on one side of the color filter, and the reflecting metal, thus losing a part of the working reflecting area generated as a result of the arrangement of the sub-opening areas.

In one embodiment, in a liquid crystal display panel according to an embodiment of the disclosure, when the ratio of the sum of the areas of the respective first opening areas to the sum of the areas of the respective color filters ranges from 5% to 18%, the value of Y can be set the largest so that the maximum alignment offset can be set larger to thereby guarantee the good yield of the liquid crystal display panel including the aligned substrates, but the value of N will be smaller, so the working reflecting area will be less increased, thus failing to well improve the reflectivity, and if the value of N is set the largest, the value of Y will be relatively small, so that the maximum alignment offset will be adjusted to a smaller one, thus degrading the good yield of the liquid crystal display panel including the aligned substrates.

When the ratio of the sum of the areas of the respective first opening areas to the sum of the areas of the respective color filters is less than 5%, the value of Y, and the value of N will be further reduced, but in this case, the value of Y shall be guaranteed preferentially, that is, the good yield of the liquid crystal display panel including the aligned substrates shall be guaranteed preferentially.

In one embodiment, in a liquid crystal display panel according to an embodiment of the disclosure, the value of the maximum alignment offset when the array substrate is aligned with the opposite substrate ranges from 0 to 4.5 micrometers.

Here if the maximum alignment offset is set larger, then the good yield of the liquid crystal display panel including the aligned array substrate and opposite substrate will be higher, but in order to guarantee the display effect, the maximum alignment offset may not set too large, and the maximum alignment offset shall be set as needed in reality, although the embodiment of the disclosure will not be any particular value thereof.

Figure 17A:
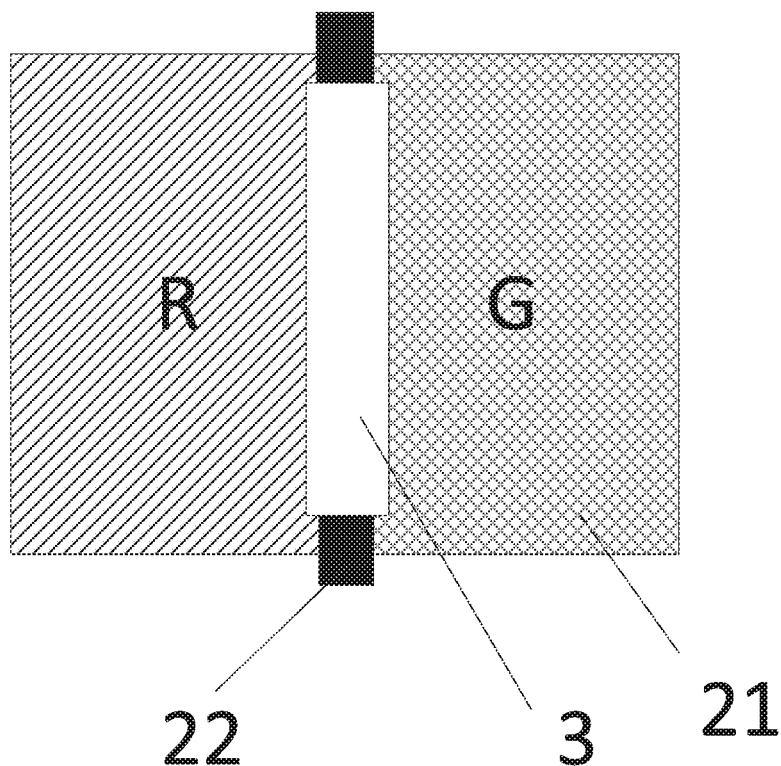
FIG. 17A to FIG. 17C are schematic structural diagrams of the shape of a first opening area in a liquid crystal display panel according to an embodiment of the disclosure.
Figure 17B:
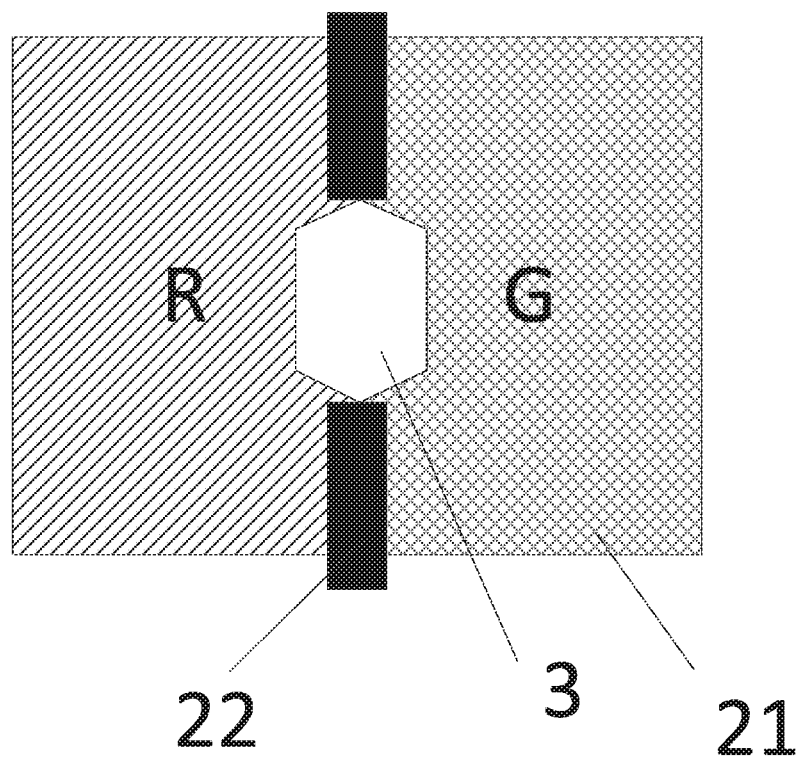
Figure 17C:
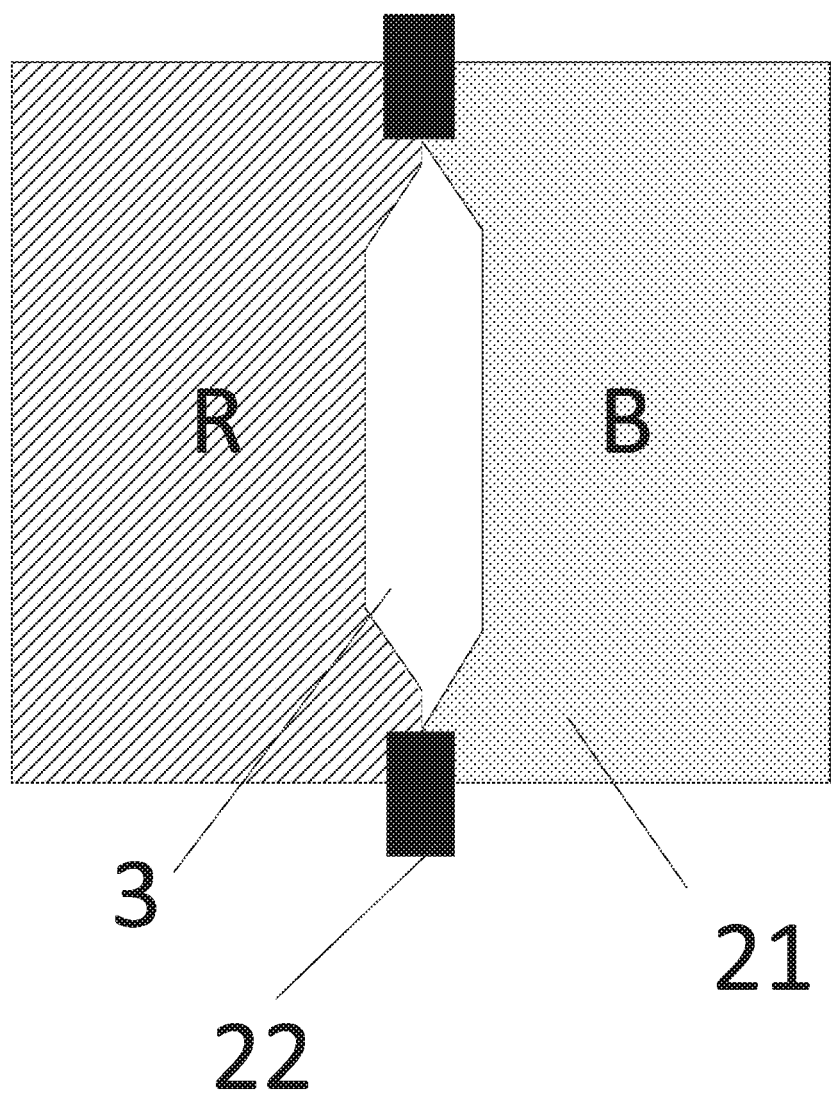

In one embodiment, in a liquid crystal display panel according to an embodiment of the disclosure, the shapes of the first opening areas 3 include a rectangle and/or a polygon as illustrated in FIG. 17a to FIG. 17c.

Here when the first opening areas are polygons, they can be regular polygons as illustrated in FIG. 17b, e.g., hexagons, or can be irregular polygons as illustrated in FIG. 17c. It shall be noted that FIG. 17B and FIG. 17c merely illustrate the respective embodiments of their shapes, but they will not be limited to these two shapes. They can alternatively be polygons in any other shape, although the embodiment of the disclosure will not be limited to any particular shape thereof.

Figure 18:
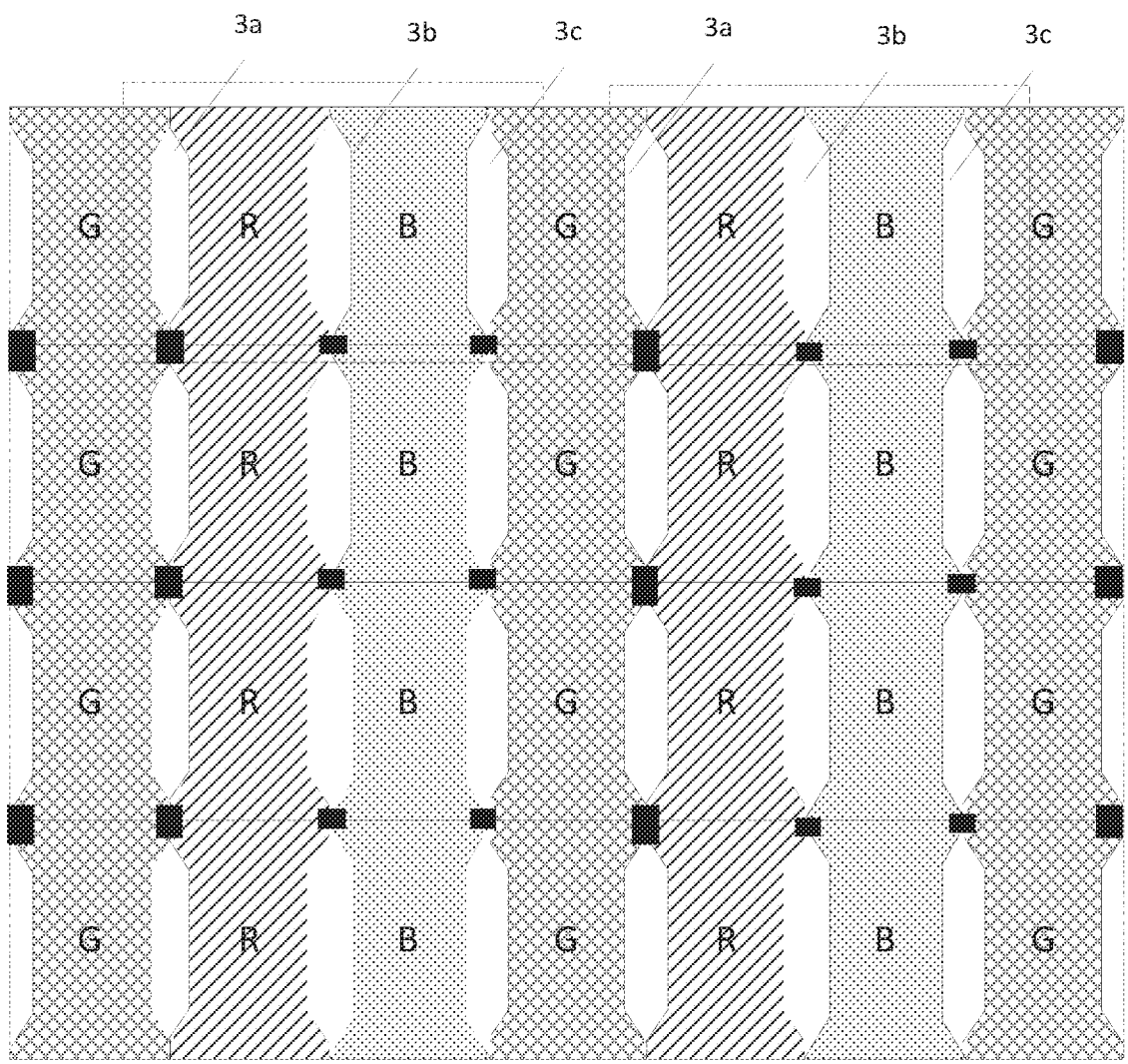
FIG. 18 is a schematic structural diagram of first opening areas arranged in a liquid crystal display panel according to an embodiment of the disclosure.

In one embodiment, in a liquid crystal display panel according to an embodiment of the disclosure, the first opening areas 3 are arranged periodically in the first direction, and the shapes of the first opening areas 3 in the same periodicity are different, as illustrated in FIG. 18.

Particularly in a liquid crystal display panel according to an embodiment of the disclosure, as illustrated in FIG. 18, areas of color filters in different colors in the display panel are not exactly equal, but determined according to the proportion of the display colors, and the light emission efficiency, so the area of the color filters corresponding to a color with a smaller desirable area is smaller, and accordingly the areas of the corresponding sub-opening areas on both of the sides of the color filters in that color in the first direction are larger, so that there are different areas and shapes of two sub-opening areas between the adjacent color filters in different colors, and thus the shapes of the adjacent first opening areas are different, that is, the shapes and the areas of the first opening areas 3a, 3b, and 3c are different. Since the colors of the color filters in the first direction vary periodically, the first opening areas are also arranged periodically in the first direction. FIG. 18 merely illustrates an embodiment in which there are three shapes of the first opening areas, but they will not be limited thereto. The first opening areas can be in any other shapes, although the embodiment of the disclosure will not be limited thereto.

Figure 19:
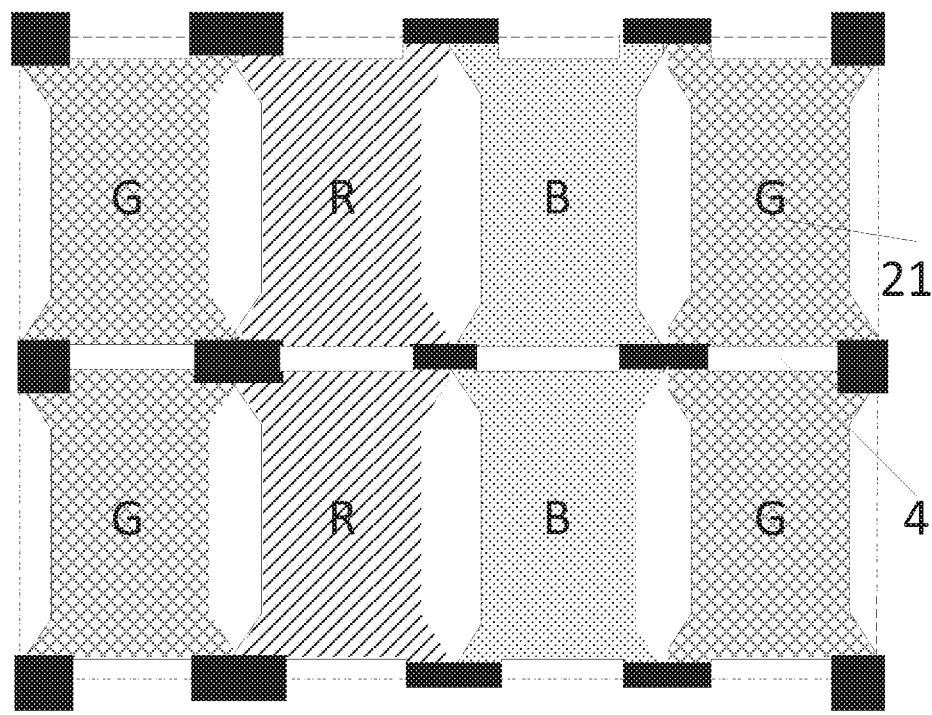
FIG. 19 is a schematic structural diagram of second opening areas in a liquid crystal display panel according to an embodiment of the disclosure.

In one embodiment, in a liquid crystal display panel according to an embodiment of the disclosure, as illustrated in FIG. 19, the color filters 21 in the same color are arranged in the second direction, and second opening areas 4 are arranged between the color filters 21 in the same color.

There are second overlapping areas between orthographic projections of the reflecting metal, and the second opening areas 4 onto the array substrate.

Particularly in a liquid crystal display panel according to an embodiment of the disclosure, in order to further increase the working reflecting area, the second opening areas can be further arranged between the adjacent color filters in the same color, where the orthographic projections of the second opening areas onto the array substrate do not overlap with the orthographic projections of the spacers onto the array substrate so that there are the second overlapping areas between the orthographic projections of the second opening areas onto the array substrate, and the orthographic projection of the reflecting metal onto the array substrate, thus increasing the working reflecting area, and improving the reflectivity.

Figure 20:
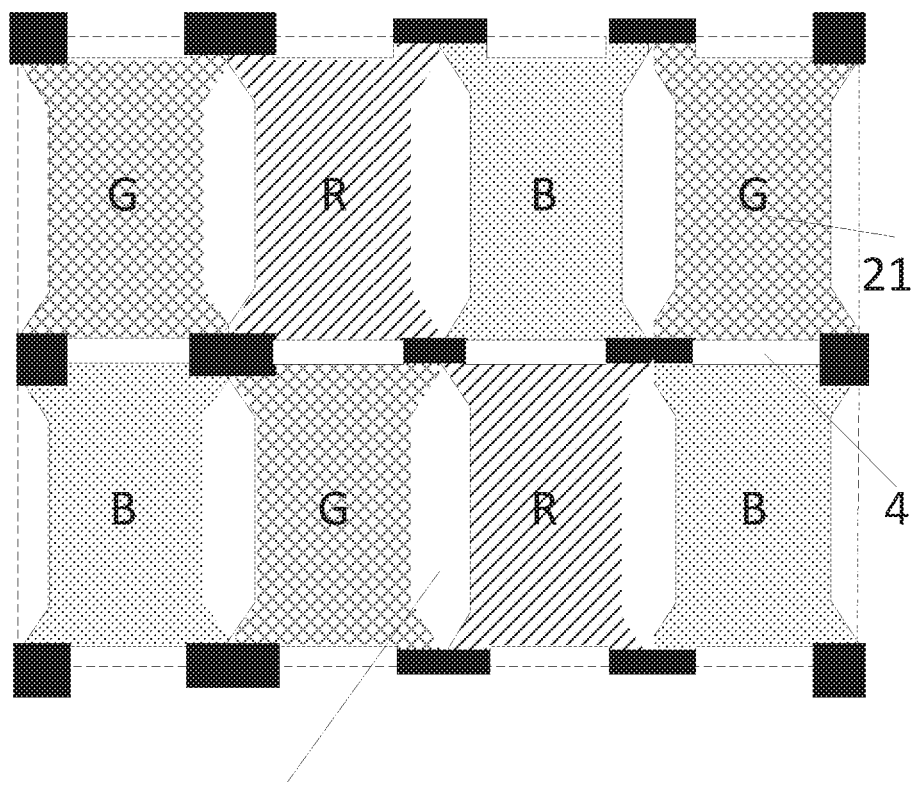
FIG. 20 is a schematic structural diagram of a further arrangement pattern of color filters corresponding to first opening areas and second opening areas in a liquid crystal display panel according to an embodiment of the disclosure.
Figure 21:
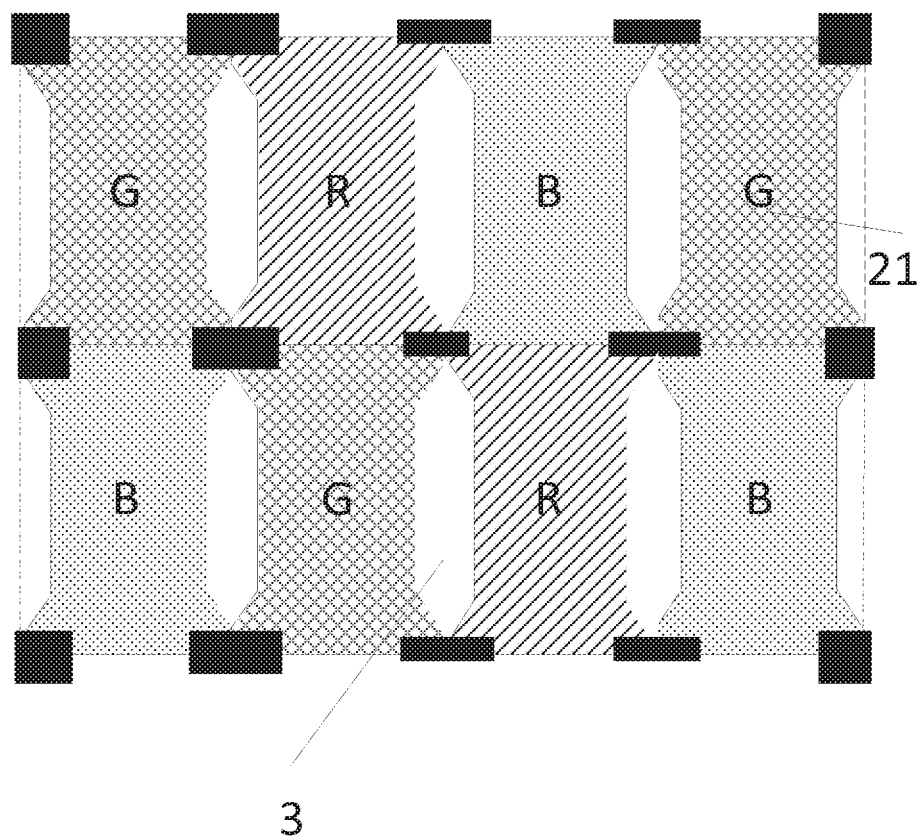
FIG. 21 is a schematic structural diagram of a further arrangement pattern of color filters corresponding to first opening areas in a liquid crystal display panel according to an embodiment of the disclosure.
Figure 22:
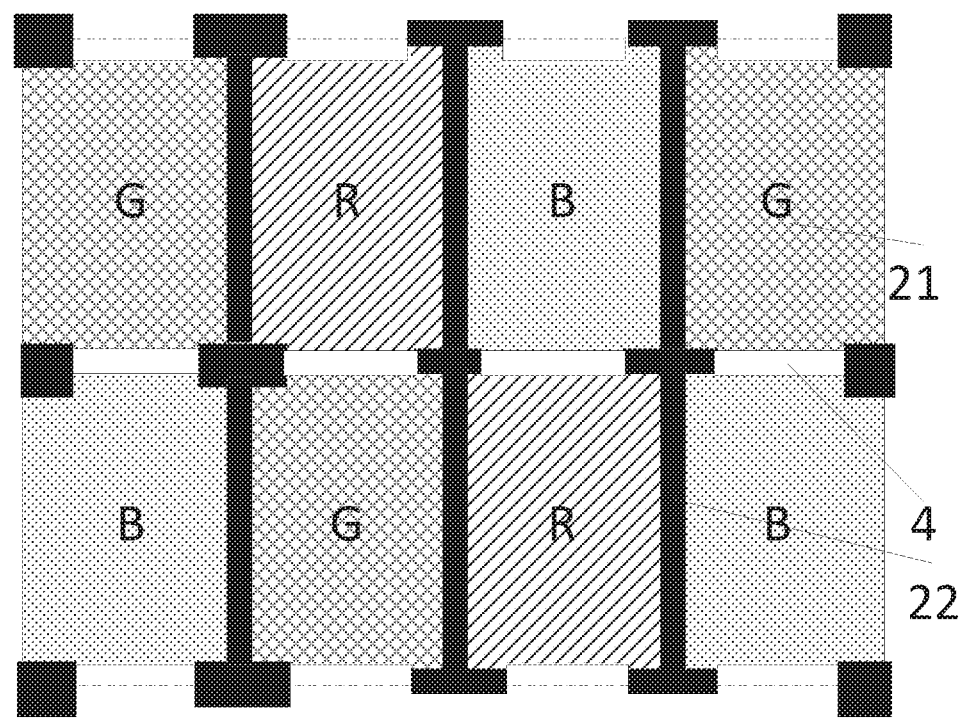
FIG. 22 is a schematic structural diagram of a further arrangement pattern of color filters corresponding to second opening areas in a liquid crystal display panel according to an embodiment of the disclosure.

In one embodiment, in a liquid crystal display panel according to an embodiment of the disclosure, as illustrated in FIG. 20, the colors of two adjacent color filters 21 in the first direction are different, and the colors of two adjacent color filters 21 in the second direction are different; and for the color filters arranged in this pattern, the first opening areas 3 are arranged between the adjacent color filters 21 in different colors in the first direction, and the second opening areas 4 are arranged between the adjacent color filters 21 in different colors in the second direction. Of course, in order to guarantee working display areas of the respective pixels, as illustrated in FIG. 21 and FIG. 22, alternatively the opening areas may be arranged only between the adjacent color filters 21 in different colors in the first direction or the second direction, and the black matrixes 22, etc., may be arranged between the adjacent color filters in different colors in the other direction to thereby prevent color crosstalk from occurring between the color filters in different colors.

Figure 23:
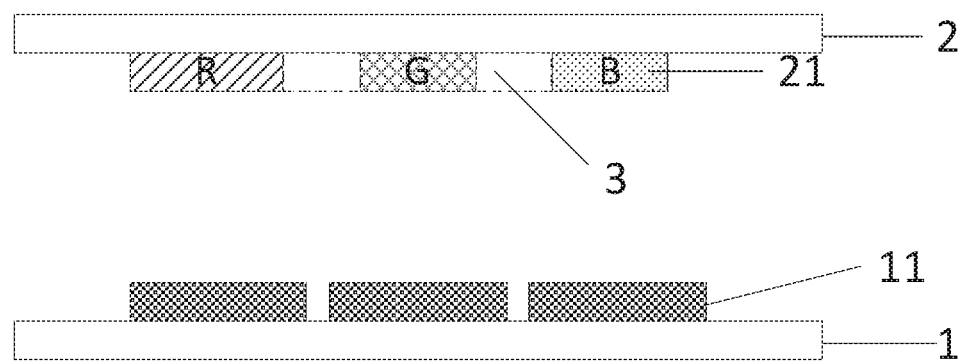
FIG. 23 is another schematic structural diagram of a liquid crystal display panel according to an embodiment of the disclosure in a sectional view.

In one embodiment, in a liquid crystal display panel above according to an embodiment of the disclosure, the reflecting metal 11 includes a plurality of reflecting electrodes arranged in an array, and the reflecting electrodes are arranged corresponding to the color filters 21 in a one-to-one manner, as illustrated in FIG. 23.

Particularly in a liquid crystal display panel according to an embodiment of the disclosure, the reflecting electrodes can be connected with the pixel electrodes so that storage capacitances of the pixel electrodes can be increased, and their resistances can be reduced, to thereby improve the display quality of the liquid crystal display panel.

In one embodiment, a liquid crystal display panel according to an embodiment of the disclosure further includes pixel electrodes arranged on the array substrate, and the reflecting electrodes are reused as the pixel electrodes.

Particularly in a liquid crystal display panel according to an embodiment of the disclosure, the reflecting electrodes are reused as the pixel electrodes so that no reflecting electrode layer will be arranged separately to thereby dispense with a fabrication process, and reduce the thickness of the liquid crystal display panel, thus making the liquid crystal display panel light-weighted and thinned.

In one embodiment, in a liquid crystal display panel according to an embodiment of the disclosure, the reflecting electrodes include reflecting metal electrodes.

Here the reflecting metal electrodes can be silver electrodes, aluminum electrodes, or silver- or aluminum-plated electrodes, and of course, they can alternatively be any other metal electrodes capable of reflecting, although the embodiment of the disclosure will not be limited thereto.

In one embodiment, a liquid crystal display panel according to an embodiment of the disclosure further includes spacers arranged between the array substrate and the opposite substrate, where orthographic projections of the black matrixes onto the array substrate cover at least orthographic projections of the spacers onto the array substrate.

Particularly in a liquid crystal display panel according to an embodiment of the disclosure, the orthographic projections of the black matrixes onto the array substrate cover at least the orthographic projections of the spacers onto the array substrate to thereby avoid light from being leaked at the positions of the spacers, so as to improve the contrast of the liquid crystal display panel. Black matrixes may be arranged between adjacent color filters in two different colors in addition to the black matrixes arranged at their corresponding positions to thereby prevent color crosstalk from occurring between the adjacent color filters in two different colors, and the positions and the areas of the black matrixes arranged between the adjacent color filters in two different colors can be determined according to the positions and the areas of the first opening areas, although the embodiment of the disclosure will not be limited thereto.

In one embodiment, in a liquid crystal display panel according to an embodiment of the disclosure, the color filters includes at least a red color filter, a green color filter, or a blue color filter to provide three primary colors of the liquid crystal display panel so as to satisfy a demand for displaying on the liquid crystal display panel.

Figure 24:
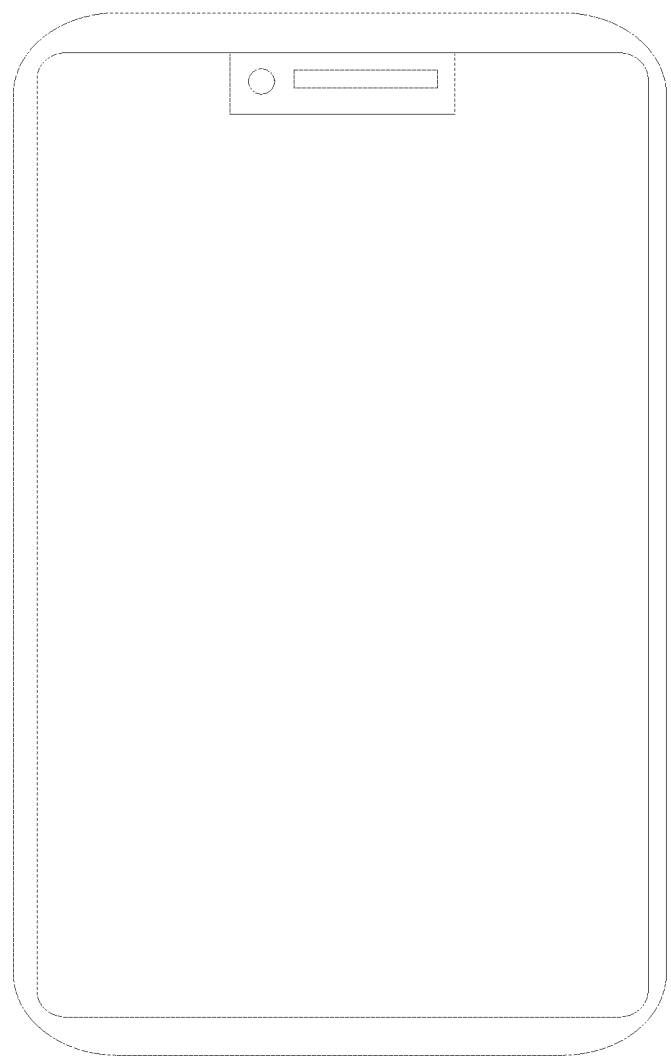
FIG. 24 is a schematic structural diagram of a display device according to an embodiment of the disclosure.

Based upon the same inventive idea, an embodiment of the disclosure further provides a display device as illustrated in FIG. 24 including a liquid crystal display panel according to an embodiment of the disclosure. The display device can be a mobile phone, a tablet computer, a TV set, a monitor, a notebook computer, a digital photo frame, a navigator, or any other product or component with a display function. All the other components indispensable to the display device shall readily occur to those ordinarily skilled in the art, so a repeated description thereof will be omitted here, and the embodiment of the disclosure will not be limited thereto. Reference can be made to the embodiments of the display panel above for an implementation of the display device, and a repeated description thereof will be omitted here.

In a liquid crystal display panel and a display device according to an embodiments of the disclosure, the liquid crystal display panel includes: an array substrate and an opposite substrate arranged opposite to each other, reflecting metal located on the side of the array substrate facing the opposite substrate, color filters arranged in an array on the side of the opposite substrate facing the array substrate, and black matrixes located on the side of the opposite substrate facing the array substrate, where strip-shaped first opening areas extending in a second direction are arranged between adjacent color filters in different colors arranged in a first direction, and the black matrixes and the first opening areas are arranged alternately in the second direction, so that the area of the black matrixes shielding the reflecting metal can be reduced, the working reflecting area of the reflecting metal can be increased, and the reflectivity can be improved, while addressing color crosstalk between the adjacent color filters in different colors.

The invention claimed is:

1. A liquid crystal display panel, comprising:
    an array substrate and an opposite substrate arranged opposite to each other;
    reflecting metal located on a side of the array substrate facing the opposite substrate;
    a plurality of color filters, each corresponding to a sub pixel, arranged in an array on a side of the opposite substrate facing the array substrate; and
    black matrixes located on the side of the opposite substrate facing the array substrate;
    wherein, adjacent color filters in different colors of the plurality of color filters are arranged in a first direction, strip-shaped first opening areas extending in a second direction are arranged between each pair of the adjacent color filters in different colors in a reflecting area of the liquid crystal display panel, each of the first opening areas comprises sub-opening areas located respectively on adjacent boundaries of the pair of adjacent color filters in different colors, a width of each of the pair of adjacent color filters varies in the second direction, and the second direction is perpendicular to the first direction;
    the black matrixes are located between each pair of the adjacent color filters in different colors in the reflecting area of the liquid crystal display panel, and the black matrixes and the first opening areas are arranged alternately in the second direction; wherein two black matrixes located between a pair of the adjacent color filters are separated by a first opening area between the pair of the adjacent color filters; and a width of the first opening area near any one of the two black matrixes is smaller than a width of the first opening area at a middle point between the two black matrixes; and
    the reflecting metal is overlapped with orthographic projection of each of the first opening areas on the array substrate in a first overlapping area.

2. The liquid crystal display panel of claim 1, wherein areas of two sub- opening areas on boundaries of a same color filter in the first direction are equal.

3. The liquid crystal display panel of claim 2, wherein adjacent color filters in a same color of the plurality of color filters are arranged in the second direction, and second opening areas are arranged between each pair of the adjacent color filters in a same color, and
    the reflecting metal is overlapped with orthographic projection of each of the second opening areas on the array substrate in a second overlapping area.

4. The liquid crystal display panel of claim 2, wherein areas of sub-opening areas on boundaries of different color filters in different colors are unequal.

5. The liquid crystal display panel of claim 4, wherein adjacent color filters in a same color of the plurality of color filters are arranged in the second direction, and second opening areas are arranged between each pair of the adjacent color filters in a same color, and
    the reflecting metal is overlapped with orthographic projection of each of the second opening areas on the array substrate in a second overlapping area.

6. The liquid crystal display panel of claim 1, wherein a largest width of the first opening area is at least equal to a width of a black matrix in the first direction.

7. The liquid crystal display panel of claim 6, wherein adjacent color filters in a same color of the plurality of color filters are arranged in the second direction, and second opening areas are arranged between each pair of the adjacent color filters in a same color, and
    the reflecting metal is overlapped with orthographic projection of each of the second opening areas on the array substrate in a second overlapping area.

8. The liquid crystal display panel of claim 1, wherein a sum of areas of the respective first opening areas is less than or equal to 67% of a sum of areas of respective color filters of the plurality of color filters.

9. The liquid crystal display panel of claim 8, wherein when a ratio of the sum of the areas of the respective first opening areas to the sum of the areas of the respective color filters ranges from 45% to 67%, a length of the first overlapping area in the first direction is no less than a maximum alignment offset when the array substrate is aligned with the opposite substrate.

10. The liquid crystal display panel of claim 8, wherein when a ratio of the sum of the areas of the respective first opening areas to the sum of the areas of the respective color filters ranges from 18% to 45%, a length of the first overlapping area in the first direction is equal to a maximum alignment offset when the array substrate is aligned with the opposite substrate.

11. The liquid crystal display panel of claim 10, wherein a value of the maximum alignment offset when the array substrate is aligned with the opposite substrate ranges from 0 to 4.5 micrometers.

12. The liquid crystal display panel of claim 8, wherein adjacent color filters in a same color of the plurality of color filters are arranged in the second direction, and second opening areas are arranged between each pair of the adjacent color filters in a same color, and
the reflecting metal is overlapped with orthographic projection of each of the second opening areas on the array substrate in a second overlapping area.

13. The liquid crystal display panel of claim 1, wherein the first opening areas are arranged periodically in the first direction, and shapes of the first opening areas in a same periodicity are different.

14. The liquid crystal display panel of claim 1, wherein adjacent color filters in a same color of the plurality of color filters are arranged in the second direction, and second opening areas are arranged between each pair of the adjacent color filters in a same color, and
the reflecting metal is overlapped with orthographic projection of each of the second opening areas on the array substrate in a second overlapping area.

15. The liquid crystal display panel of claim 1, wherein the reflecting metal comprises a plurality of reflecting electrodes arranged in an array, and the reflecting electrodes are arranged corresponding to the plurality of color filters in a one-to-one manner.

16. The liquid crystal display panel of claim 15, wherein the liquid crystal display panel further comprises pixel electrodes arranged on the array substrate, and the reflecting electrodes are reused as the pixel electrodes.

17. The liquid crystal display panel of claim 1, wherein the liquid crystal display panel further comprises spacers arranged between the array substrate and the opposite substrate, wherein orthographic projections of the black matrixes onto the array substrate at least cover orthographic projections of the spacers onto the array substrate.

18. The liquid crystal display panel of claim 1, wherein the color filters comprise at least a red color filter, a green color filter, or a blue color filter.

19. A display device, comprising a liquid crystal display panel, wherein the liquid crystal display panel comprises:
an array substrate and an opposite substrate arranged opposite to each other;
reflecting metal located on a side of the array substrate facing the opposite substrate;
a plurality of color filters, each corresponding to a sub pixel, arranged in an array on a side of the opposite substrate facing the array substrate; and
black matrixes located on the side of the opposite substrate facing the array substrate;
wherein, adjacent color filters in different colors of the plurality of color filters are arranged in a first direction, strip-shaped first opening areas extending in a second direction are arranged between each pair of the adjacent color filters in different colors in a reflecting area of the liquid crystal display panel, each of the first opening areas comprises sub-opening areas located respectively on adjacent boundaries of the pair of adjacent color filters in different colors, a width of each of the pair of adjacent color filters varies in the second direction, and the second direction is perpendicular to the first direction;
the black matrixes are located between each pair of the adjacent color filters in different colors in the reflecting area of the liquid crystal display panel, and the black matrixes and the first opening areas are arranged alternately in the second direction; wherein two black matrixes located between a pair of the adjacent color filters are separated by a first opening area between the pair of the adjacent color filters; and a width of the first opening area near any one of the two black matrixes is smaller than a width of the first opening area at a middle point between the two black matrixes; and
the reflecting metal is overlapped with orthographic projection of each of the first opening areas on the array substrate in a first overlapping area.

* * * * *